United States Patent [19]
Puckett

[11] 3,711,112
[45] Jan. 16, 1973

[54] HELPER AXLE ASSEMBLY FOR VEHICLES

[75] Inventor: George W. Puckett, Tulsa, Okla.

[73] Assignee: Tag-Along Corporation, Tulsa, Okla.

[22] Filed: Aug. 13, 1970

[21] Appl. No.: 63,367

[52] U.S. Cl. ............................280/81 R, 280/124 R
[51] Int. Cl. ...............................................B60g 11/14
[58] Field of Search ..280/81 R, 81 A, 109, 110, 116, 280/118, 117, 112

[56] References Cited

UNITED STATES PATENTS

| 3,544,128 | 12/1970 | Storm | 280/81. A |
| 2,976,051 | 3/1961 | Morey | 280/81 R |
| 2,862,727 | 12/1958 | Oneill | 280/81 R |

Primary Examiner—Philip Goodman
Attorney—Head & Johnson

[57] ABSTRACT

A helper axle is attached to a vehicle rearwardly of the rear axle thereof and serves to level the vehicle when loaded to maintain proper front wheel castor. When the vehicle is empty, the helper axle can be raised upwardly into an inoperative position.

5 Claims, 5 Drawing Figures

PATENTED JAN 16 1973 3,711,112
SHEET 1 OF 2
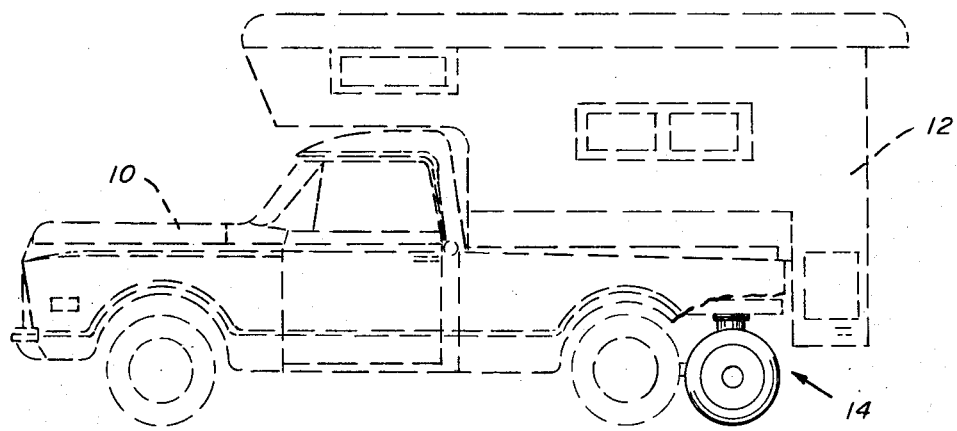
FIG. 1
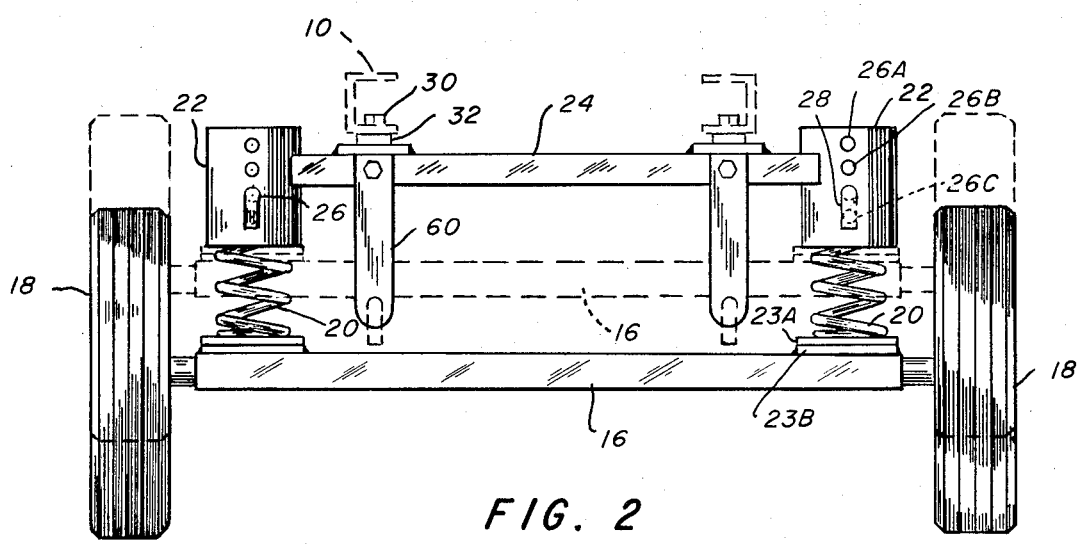
FIG. 2
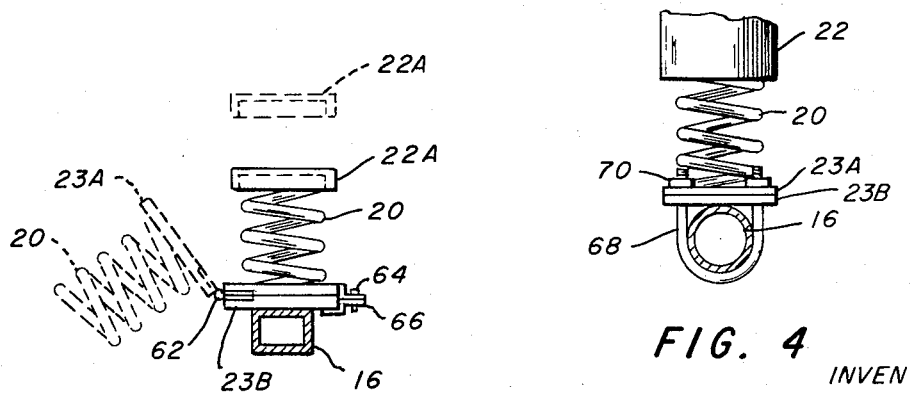
FIG. 3
FIG. 4
INVENTOR.
GEORGE W. PUCKETT
BY
Head & Johnson
ATTORNEYS

3,711,112

HELPER AXLE ASSEMBLY FOR VEHICLES

BACKGROUND OF THE INVENTION

This invention relates to helper axles and more particularly relates to a helper axle assembly for light vehicles such as pickup trucks. Oftentimes the beds of pickup trucks are loaded with heavy objects such as campers. These campers, being heavy, have a tendency to raise the front end of the truck thereby putting an improper castor on the front wheels and reducing the steering and braking ability of the vehicle.

It is therefore an object of this invention to present a helper axle assembly for light trucks which is designed to maintain when the truck bed is heavily loaded proper castor on front wheels to insure proper steering and braking of the vehicle.

It is a further object of this invention to present a helper axle assembly for a pickup truck which is capable of being raised upwardly off the ground when the helper axle is not needed such as when the truck bed is empty.

It is a further object of this invention to present a helper axle assembly which is adaptable with a minimum of adjustments to different makes of pickup trucks.

SUMMARY OF THE INVENTION

A helper axle assembly having rotatable wheels substantially in alignment with the rear wheels of a pickup truck is interconnected to the truck rearwardly of the rear axle thereof. Coil springs interconnect the helper axle with the underside of the bed of the truck such that when the truck is loaded, the helper axle assembly carries a portion of the weight of the truck load to maintain proper castor on the front wheels of the vehicle. When the truck is empty, the helper axle assembly is raised upwardly into an inoperable position.

BRIEF DESCRIPTION OF THE DRAWINGS

FIG. 1 is a side view of a pickup truck carrying a camper having installed thereon the helper axle assembly of this invention.

FIG. 2 is a rear view of the axle showing in phantom the same raised into the inoperative position.

FIG. 3 is a side view of one of the springs of this invention showing an alternative method of the attaching of the springs to the helper axle.

FIG. 4 shows still another method of the attaching of the springs to the helper axle.

DETAILED DESCRIPTION

Figure 5:
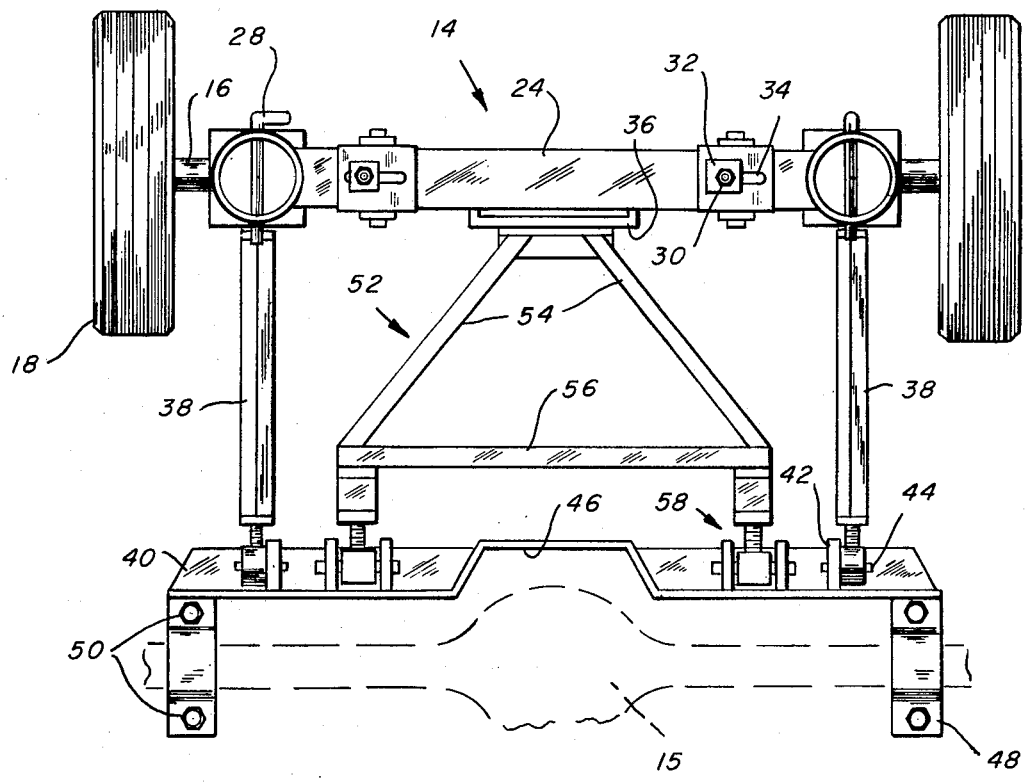
FIG. 5 is a top view of the helper axle assembly of this invention.

Looking now at FIG. 1, there is shown in phantom a pickup truck 10 carrying on the bed thereof a camper 12. Interconnected to the pickup rearwardly of the rearward axle thereof is the helper axle assembly of this invention 14 having wheels 18 touching the ground and supporting a portion of the truck's load weight.

Looking now at FIG. 2, the helper axle assembly of this invention includes an elongated helper axle 16 to which is rotatably attached at the ends thereof wheels 18. The helper axle may be made either rectangular or circular in cross section tubing or other suitable material of sufficient strength to support the wheels. Secured to axle 16 inwardly of the wheels 18 are spaced apart parallel helical springs 20 which project vertically upwardly therefrom to become received with inverted cups 22 carried by and located on the ends of an elongated vehicle attachment member 24, the longitudinal axis of which is substantially parallel to the axis of helper axle 16. The securing of springs 20 to axle 16 may be accomplished in a variety of methods. As one example, the lower end of spring 20 may be suitably welded to a plate 23A which abuts and overlaps a mating plate 23B which in turn is welded directly to helper axle 16. Plates 23A and 23B are firmly attached together such as by welding to rigidly interconnect the springs of the helper axle.

A second method of attaching spring 20 to helper axle 16 is shown in FIG. 3. In this method, as in the previously mentioned method, the lower end of spring 20 is welded to a plate 23A and a mating plate 23B is welded directly to the helper axle 16. However here rather than being welded to plate 23B, plate 23A is pivotally attached thereto by means of a hinge member 62. This enables spring 20 to be pivoted away from its vertical upstanding position directly above the helper axle, the purpose of which will be subsequently discussed. A pin 64 received through registered aligned eyes 66 received on the sides of the plates opposing hinge 62 releasably holds spring 20 in a vertical upright position. The upper end of the spring is received within a shallow cup 22A.

FIG. 4 shows a method of interconnecting the spring to the helper axle when circular in cross-sectional tubing is utilized for the helper axle 16. As in the previous embodiment, plate 23A is welded to the lower end of spring 20. However here plate 23B is not welded to the helper axle but a U-bolt 68 passing through aligned transversed aperture end plates 23A and 23B and threadably engaged by nuts 70 interconnect the spring to the helper axle. An advantage of this method of attachment is that the helper axle 16 can rotate relative to spring 20 to aid in the improper positioning of wheels 18 on the ground as will become evident in the subsequent discussion.

Referring now back to FIG. 2 and particularly inverted cups 22, such contain along the length of the walls thereof diametrically opposed apertures 26 in which is inserted bolt 28 against which the upper end of spring 20 bears and through the weight of the truck load is transmitted to the spring.

Vehicle attachment member 24 is secured to the undercarriage or bed of the pickup truck rearwardly of the rear axle of the truck by means of nuts and bolts 30. Suitable shims 32 are wedged between the attachment member 24 and the truck undercarriage to obtain proper alignment and weight distribution of the wheels 18. As can be seen in FIG. 5, attachment member 24 is slotted at 34 to receive bolts 30 and permits orientation of bolts 30 for alignment thereof with the undercarriage of different type trucks.

In addition to being interconnected to the undercarriage of the truck, helper axle assembly 14 is also interconnected to the rearward axle 15 of the truck. Progressing substantially perpendicular from plates 23A and secured thereto are two spaced-apart connecting rods 38 which connect helper axle 16 to an elongated vehicle axle attachment bar 40. Connecting rods 38 are constructed in the form of turnbuckles and are pivotally connected to vehicle axle attachment bar 40 by means of ears 42 to which the screw threaded portion of the turnbuckles are attached by means of the pin 44. Vehicle axle attachment bar 40 may be of a variety of shapes such as circular or rectangular; however, it has been found that the use of commercially available angle iron performs the function well. In order to permit access to the differential plug of the truck's rear axle, the vertical leg of the angle iron is recessed at 46. Bar attachment member 40 is directly attached to the rear axle of the vehicle by means of brackets 48 which consist of two semi-circular members which surround the rear axle of the vehicle and are secured together by means of bolts 50 in a manner commonly known in the art.

For torsional strength V-shaped bracing 52 is introduced between the helper axle and vehicle attachment member 40 and intermediate connecting rods 38. V-bracing 52 comprises two diverging arms 54 which extend forwardly from helper axle 16 and which are connected at the forward end thereof by horizontal member 56. For additional torsional strength, the rear ends of arms 54 do not meet but are welded to a common bracket 36. The horizontal member 56 of V-bracing 52 is pivotally connected to the vehicle attachment bar 40 by means of a threaded bolt and receptacle arrangement 58; the head of the bolt is received between ears attached to attachment bar 40 and a pin is inserted through the ears and the head. The threaded portion of the bolt threadably engages a receptacle which is welded to the horizontal member.

With the connecting rods 38 and the V-bracing 52 being pivotally connected to vehicle axle attachment bar 40, the spatial distance between bar 40 and the helper axle 16 can be adjusted by simply threading the bolt members into or from their respective receptacles. Thus, a single helper axle assembly can be adjusted in a variety of different brand pickup trucks. With the helper axle attached to the rearward axle of the pickup and also the truck bed a portion of the weight of any load on the truck will be transferred to the helper axle assembly thereby relieving the load on the rear springs of the truck which in turn enables the front wheels to have the proper castor to enable optimum steering and braking of the truck.

During operation, the pivotal ability of the helper axle 16 about axle attachment bar 40 enables the springs 20 to cushion the ride.

When the truck is unloaded and there is no need for the helper rear axle 16, a method is provided in FIG. 2 for raising the helper axle upwardly into an inoperative position such that the truck can be operated on the normal front and rear axles in a manner as is commonly done with pickups not having the helper axle assembly.

Looking specifically at FIG. 2, extending downwardly from the vehicle attachment member 24 are a pair of spaced apart forks 60 which are in transverse alignment with the helper axle 16 and which have aligned apertures in the lower ends thereof. When it is desired to raise the helper axle, bolts 28 are withdrawn from inverted cups 22 to allow the springs to slide upwardly into the cups. The helper axle is then raised sufficiently such as by means of a jack to become received between the forks 60. Bolts 28 are then inserted in the lower apertures 61 in the lower end of the ears to hold the helper axle in the upper inoperative position.

When the helper axle assembly incorporates the spring attachment method illustrated in FIG. 3 rather than being slid upwardly within cups 22, cups 22A are raised upwardly to allow the springs 20 to escape the cups and be pivoted away from the axle as is shown in phantom in FIG. 3. The axle can then be raised unimpededly upwardly and held within forks 60 as previously discussed. As will be appreciated, the cups utilized in FIG. 3 are much shallower than those used in the embodiment illustrated in FIG. 2 and in this embodiment bolts 28 are not necessary.

Although different size wheels 18 can be used on the helper axle, it has been found that for ordinary pickups an 8-inch wheel performs satisfactorily due to the fact that when the axle is raised in an upper inoperative position, there is a 6-inch ground clearance with an 8-inch wheel.

During the detailed description of the preferred embodiment specific language has been used for the sake of clarity; however, it is to be understood that the words used are not words of limitation and include all equivalents which operate in a similar manner to perform a similar purpose. For example, brakes and shocks could be added to the helper axle as optional equipment as also could a wench to raise the axle into the inoperative position.

What is claimed:

1. An assembly for a vehicle for carrying a portion of the weight normally carried by a vehicle axle comprising:
    an elongated bar secured parallel to said vehicle axle;
    a helper axle spaced from and parallel to said axle of said vehicle;
    wheels carried by said helper axle at the ends thereof and being rotatable about a horizontal axis;
    spaced apart connecting rods, each having one end pivotally secured to said bar and the other end secured to said helper axle;
    a V-bracing member intermediate said connecting rods connected at one end to said bar and at the other end to said helper axle, said V-bracing member adapted to torsionally strengthen said helper axle assembly; and
    spring means inserted between said helper axle and said vehicle adapted to transfer a portion of the weight of said vehicle to said helper axle and to said wheels.

2. An apparatus as in claim 1 wherein said spring means are spaced apart helical springs, and including inverted cups secured to said vehicle for receiving the upper portions of said springs.

3. An apparatus as in claim 1 including:
    at least one pair of paralleled spaced apart fork members extending downwardly from said vehicle, said fork members having at the lower end thereof apertures in alignment; and
    wherein said inverted cups contain in the walls thereof registered apertures which receive a bolt member against which the upper end of said springs bare when said helper axle is in operative position, said bolt being removable whereby said helper axle can be raised upwardly into an inoperative position wherein said helper axle is straddled by said forks and is held therein by insertion of a bolt member into said fork members through said apertures.

4. An apparatus as in claim 1 wherein the length of said connecting rod and said V-bracing member can be adjusted to vary the spacing between said vehicle axle and said helper axle.

5. An assembly for a vehicle for carrying a portion of the weight of said vehicle load comprising:
 a helper axle spaced from and parallel to an axle of said vehicle;
 wheels carried by said helper axle at the ends thereof normally engaging the ground;
 means of pivotally attaching said helper axle to vehicle;
 spring means between said helper axle and said vehicle adapted to transfer a portion of the weight of said vehicle to said helper axle and to said wheels; and
 means of releasably retaining said helper axle in an inoperable position wherein said wheels are raised above the ground.

* * * * *